May 1, 1928.

R. T. HOSKING

LOCK WASHER

Filed Feb. 7, 1927

1,667,803

INVENTOR
Richard T. Hosking
BY George B. Willcox
ATTORNEY

Patented May 1, 1928.

1,667,803

UNITED STATES PATENT OFFICE.

RICHARD T. HOSKING, OF WILMETTE, ILLINOIS, ASSIGNOR TO SHAKEPROOF LOCK WASHER COMPANY, INCORPORATED, DIVISION OF ILLINOIS TOOL WORKS, OF CHICAGO, ILLINOIS, A CORPORATION OF ILLINOIS.

LOCK WASHER.

Application filed February 7, 1927. Serial No. 166,292.

This invention relates to spring lock washers of the base clutch twisted rolling tooth type, such as shown and described in Patent No. 1,419,564, issued to me June 13, 1922.

The objects of the present improvement are to overcome certain disadvantages arising from imperfectly faced nuts and bolt heads, as will now be explained.

Very often the face at the base of a nut or a screw head is not flat, or not in a plane perpendicular to the axis of the nut, but is convex or concave. A nut, having either of these peculiarities will show it when stood on its base on a flat surface. If convex, the nut will rest on the ring of metal that surrounds the hole and the outer edges of the base will not touch the flat surface. If concave, the outer parts of the base face will touch, but the inner parts near the hole will clear. Sometimes a nut is found in which the base face projects farthest from its proper plane at that part which lies in the area intermediate between the hole and the periphery of the nut. Such irregularities are very likely to be found in the bases of cold pressed and hot pressed nuts and bolt or screw heads, but sometimes are encountered in machine faced nuts made with a cutting tool that was not square with the work.

Nuts that have these and similar defects and irregularities in their base faces to a pronounced degree sometimes can not be locked very satisfactorily by means of spring lock washers of the kind that comprises a flat annular ring with radially projecting axially twisted spring teeth around its periphery.

If an outside toothed washer is used with a convex faced nut, the nut is apt to rest on the body of the washer before it engages the teeth and, therefore, does not lock properly. Likewise an internal tooth washer applied to a concaved nut is not entirely satisfactory, for the same reason.

My present invention, therefore, is found in the washer construction, whereby the so-called Hosking type of twisted tooth, that locks by reason of its tendency to roll, and thereby becomes a powerful strut between the nut and the work, is made applicable to a combined internal-external toothed washer of the kind above indicated.

Heretofore internal-external toothed washers of the aforesaid double locking capacity type have been provided with the well-known scraping or shearing teeth formed by simply slitting the body of the washer and bending the lips so formed in opposite directions with the opposite sides of the washer, but the well-known defect of such scraping teeth, namely, slippage, has prevented their general use.

In my present invention this defect is overcome by a new and useful application of the Hosking twisted teeth to internal-external tooth washers. Not only is the gripping power thereby increased, but the Hosking type of tooth is rendered adaptable to bolt heads and nuts formed with imperfect base faces.

With the foregoing and certain other objects in view, which will appear later in the specifications, my invention comprises the devices described and claimed and the equivalents thereof.

In the drawings Fig. 1 is a plan view of a washer made according to my invention.

Figure 1:
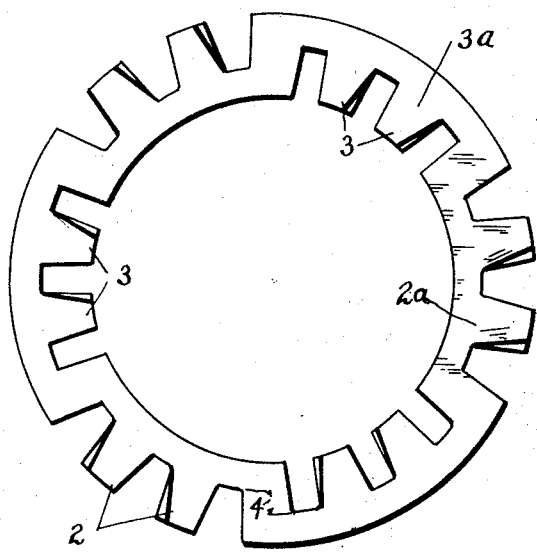
Figure 2:
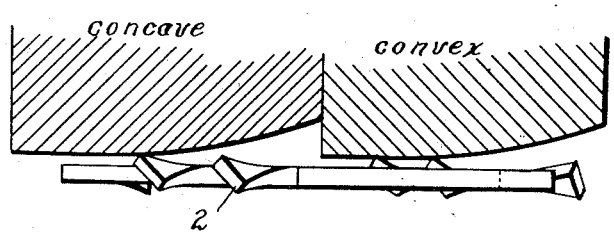
Fig. 2 is an edge view showing diagrammatically on the right-hand side, the face of a nut with convex base, and on the left-hand side the face of a nut with concave base.

As is clearly shown in the drawings, the washer is formed by punching it from a piece of spring material, such as sheet steel. It is in the general shape of a flat annular ring 1. At spaced intervals around its outer periphery are formed a plurality of series or groups of outwardly projecting radially disposed teeth 2. Around its inner periphery are formed a plurality of series of inwardly projecting radially disposed teeth 3. The outer and inner series of teeth 2 and 3 are alternately spaced around the ring, as shown in Fig. 1.

The roots 2ª of the outer teeth 2 extend inward toward the center of the washer body and are defined by an imaginary circle that lies within the corresponding imaginary circle that includes the roots $3^a$ of the internal teeth 3. Thus the external teeth, if superimposed on the internal teeth, as by folding a washer upon itself, would be found to overlap at their roots, as indicated at 4 in Fig. 1.

The object of this arrangement of the groups of internal and external teeth, which for purpose of definition I designate as the "overlapping" arrangement is, as above set forth, to adequately cover the working faces of the washer with effective locking teeth of the axially twisted rolling-lock type, fully described in Patent No. 1,419,564, and further, to permit relatively long teeth to be employed in a comparatively narrow washer, so that there may be provided as long a locking edge as possible for each tooth without necessitating too abrupt a twist, as would be the case if the teeth were very short. The overlapping feature accomplishes both of these results in a very satisfactory manner in practice.

Figure 3:
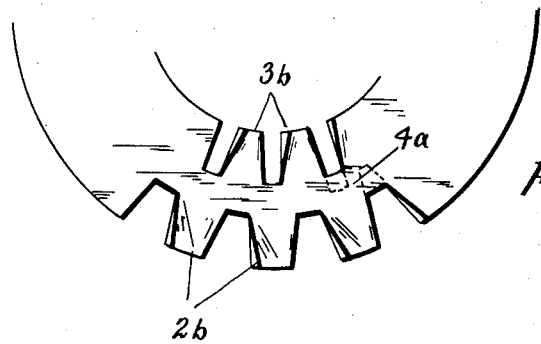
Fig. 3 illustrates a modified tooth arrangement, in which individual external and internally directed axially twisted teeth alternate around the annular ring.

In the modified form illustrated in Fig. 3 the teeth are of the same kind and they function in the same manner as the teeth described in the above-mentioned Hosking patent, and the individual teeth, $2^b$ and $3^b$ are alternately placed. In this form the tooth roots are not necessarily in the overlapped relation, as in Fig. 1, although obviously they may be extended so as to overlap if desired, as indicated by dotted lines at $4^a$. The illustration Fig. 3 shows how the preferred structure of Fig. 1 may in practice be varied as to the arrangement of the axially twisted teeth without departing from my invention as herein described and claimed.

Having thus described my invention, what I claim and desire to secure by Letters Patent is:

A washer comprising an annular ring of spring material having a plurality of groups of outwardly directed axially twisted teeth, said groups spaced apart, the roots of said teeth located near the inner periphery of the ring and their points extending to the outer periphery of the washer, complementary alternately spaced series of groups of axially twisted internally directed teeth, their roots being in overlapped relation to the roots of said outwardly directed teeth, for the purposes set forth.

In testimony whereof I affix my signature.

RICHARD T. HOSKING.